Jan. 12, 1926.  
R. A. ZOLLA  
1,569,063  
AUTOMOBILE CONTROL LEVER ATTACHMENT  
Filed July 13, 1922　　2 Sheets-Sheet 1

Inventor:  
Ralph A. Zolla,  
by Joseph D. Zolla.  
Atty.

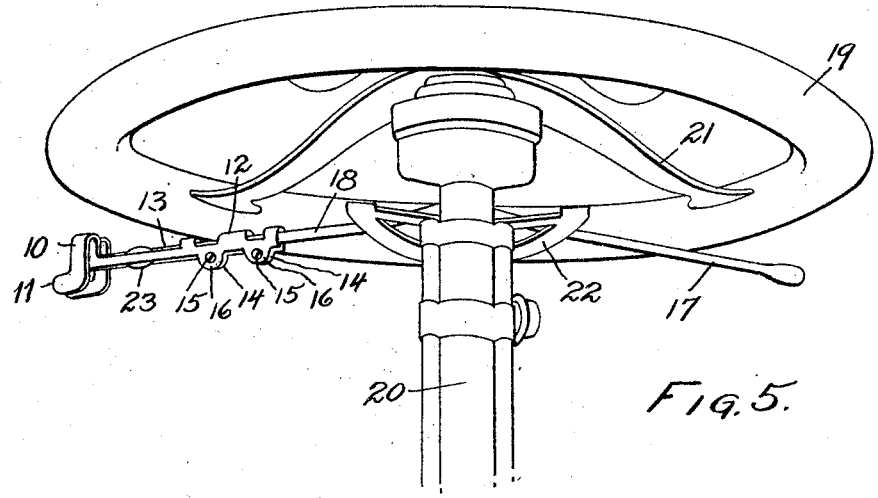
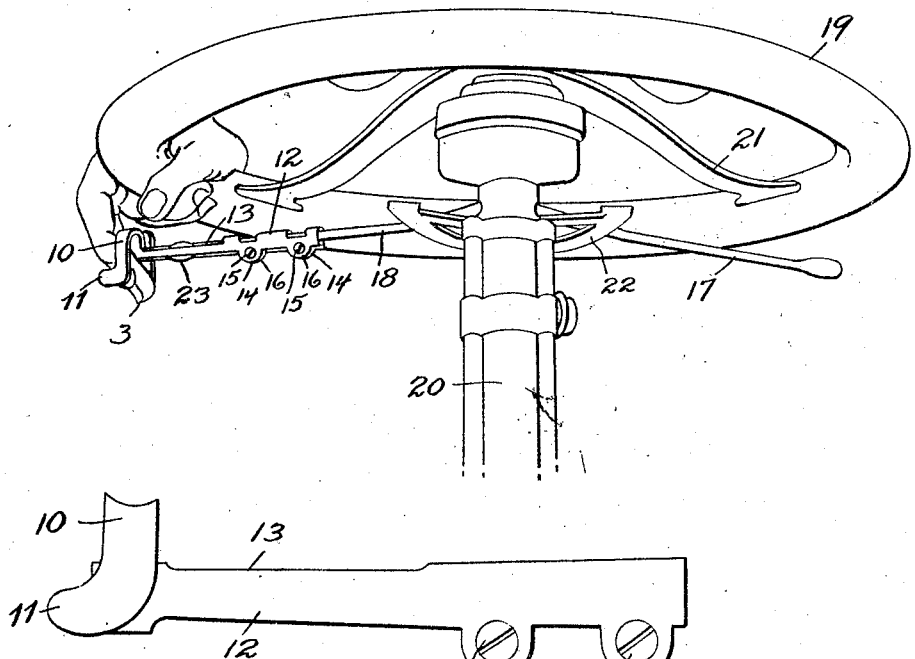

Patented Jan. 12, 1926.

1,569,063

UNITED STATES PATENT OFFICE.

RALPH A. ZOLLA, OF REVERE, MASSACHUSETTS.

AUTOMOBILE CONTROL-LEVER ATTACHMENT.

Application filed July 13, 1922. Serial No. 574,849.

*To all whom it may concern:*

Be it known that I, RALPH A. ZOLLA, a citizen of the United States, residing at Revere, in the county of Suffolk and State of Massachusetts, have invented a new and useful Improvement in Automobile Control-Lever Attachments, of which the following is a specification.

My invention relates to improvements in devices for operating gas and spark control levers of Ford automobiles and other automobiles employing similar gas and spark control levers; and while it may be effectively employed with both of the preceding classes of controlling levers, it finds its especially useful adaptation with the former; and the objects of my improvement are: First, to provide proper facilities for the adjustment of the device with respect to the varying dimensions of the parts with which it coacts, and, second, to ensure such a positioning of the device that it may remain in contact with the fingers of the operator under all exigencies.

The means heretofore employed have failed to effectuate this continuous contact. Their construction has entailed both an unnatural position of the thumb or fingers and has necessitated the removal of the hand from the steering wheel in turning a corner, a situation which requires a reaction period of negligible length if unexpected exigencies are to be coped with.

I attain these objects by the mechanism disclosed in the accompanying drawings showing the preferred form of my invention in which:

Fig. 5 is a perspective view of the attachment in operative position on a steering wheel, together with the mechanism with which it coacts;

Figure 1:
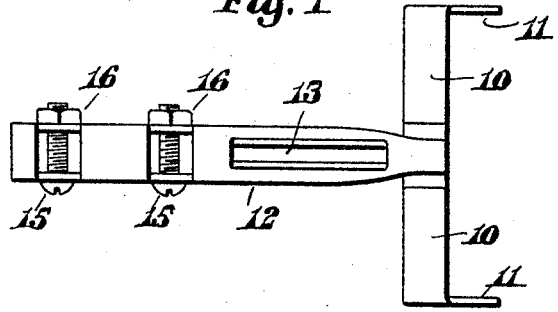
Fig. 1 is a top view of the attachment.
Figure 2:
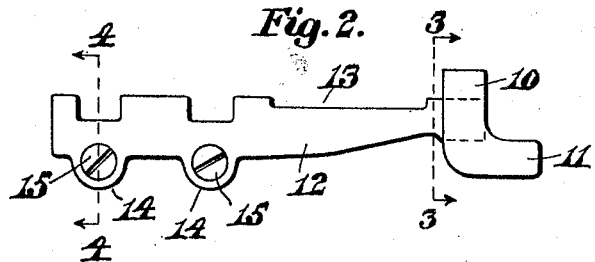
Fig. 2 is a side view of the same.
Figure 3:
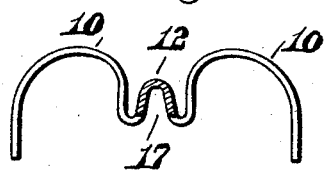
Fig. 3 is a cross section of the rounded finger forms on the end of the attachment farthest away from the steering post.
Figure 4:
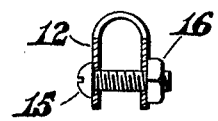
Fig. 4 is a detailed view of the end of the attachment nearest the steering post with screws, nuts, and bolts attached, showing its hollowed sectorial form.

Fig. 6 discloses the same mechanism as Fig. 4 showing in addition the actuation of the attachment by the fingers of the operator;

Fig. 7 discloses a commercial form of the device without the perforations shown in the left hand half of Fig. 2, said perforations being a mere matter of detail in construction and forming no part of the invention.

Similar numerals refer to similar parts throughout the several views.

My invention consists in the adjustability of the device and the form and position of the mechanism for exerting control as shown in Figs. 5 and 6 in which 19 represents the rim of a steering wheel, 20 the steering post, 22 the controller sector, 18 the gas control lever, and 17 the spark control lever. The attachment as shown is made with the gas control lever although it may be attached also to the spark control lever without varying the mechanical details.

The hollowed form of the attachment enables it to fit over the lever 18, the longitudinal slot 13 allowing free play of the flattened end of said controlling lever 23, while the device is pushed in and out to suit the varied dimensions of the steering wheels. When the proper position is attained with the finger forms below the rim 19 by means of the bolts 15 and the nuts 16 operating in the holes 14, a firm engagement with the controlling lever is secured. Fig. 6 shows the fingers 3 in operative position with the rounded forms 10.

It will be obvious that my invention effectuates a perfect coordination between the operation of the attachment and the steering wheel of the car inasmuch as the fingers need never leave the position shown in Fig. 6.

In turning a corner it is merely necessary to relax the grasp upon the rim of the hand actuating the attachment without removing the fingers from the finger forms, thereby allowing the rim to slide through the hand, the wheel being meanwhile manipulated by the other hand, thereby maintaining a continuous control of acceleration and retardation without changing the normal position of the fingers, a result impossible to attain with the devices heretofore used. In the event of the fingers being temporarily removed from the forms for any reason, actuation in either direction can be instantly effected by the emergency shoulders 11 without the fumbling necessitated by previous devices. Again, the shoulders are perfectly available when the driver wears an unusually thick glove which may not fit into the forms.

My invention is typified in a device which is inexpensive and durable, while its adjustability renders it instantly available when the particular size desired might not otherwise be in stock. Its advantage over the foot accelerator is that of skin contact over that of leather, and its superiority over previous devices may be summarized in the statement that the fingers continually in position are on the pulse of the engine so to speak, and the signal that the power is incommensurate with the emergency presented is followed by the reaction in a practically negligible period, a result of incalculable value in dangerous situations such as railroad crossings.

While I prefer to employ the foregoing forms, it must be understood that the same may be varied without departing from the spirit of my invention.

I claim:

1. An attachment of the character described having rounded finger forms adapted to be positioned near the rim of a steering wheel so as to be actuated by the fingers of the operator without removing the hand from said rim, and pair of emergency shoulders integral therewith.

2. An attachment having rounded finger forms and a pair of emergency shoulders integral therewith positioned near the rim of a steering wheel, said attachment having a hollowed body adapted to be adjustably carried by a controlling lever and provided with slots adapted to meet the flattened end of said lever and means for clamping said attachment to said lever.

3. The combination with a spark adjusting or throttle control lever, of a handle adjustably positioned on the outer end of the horizontal arm of said lever, the outer end of which adjustable member is provided with an inverted U-shaped finger seat.

4. An extension handle for the spark adjusting or throttle control lever of motor vehicles comprising an elongated member adapted to be secured to the end of the lever, and an inverted U-shaped finger receiving member on the outer end of said handle.

5. An extension handle of the character described comprising an elongated member, and a U-shape finger seat on one end of the member and disposed in a plane at right angles to the plane of the member.

6. An extension handle of the character described, comprising a body, and elements depending from one end of the body and spaced relatively to form a finger seat.

RALPH A. ZOLLA.